United States Patent
Han et al.

(10) Patent No.: US 12,029,368 B2
(45) Date of Patent: *Jul. 9, 2024

(54) DISHWASHER

(71) Applicant: LG Electronics Inc., Seoul (KR)

(72) Inventors: Shinwoo Han, Seoul (KR); Yongjin Choi, Seoul (KR); Kyuchang Jung, Seoul (KR)

(73) Assignee: LG Electronics Inc., Seoul (KR)

(*) Notice: Subject to any disclaimer, the term of this patent is extended or adjusted under 35 U.S.C. 154(b) by 990 days.

This patent is subject to a terminal disclaimer.

(21) Appl. No.: 16/969,791

(22) PCT Filed: Feb. 13, 2019

(86) PCT No.: PCT/KR2019/001750
§ 371 (c)(1),
(2) Date: Aug. 13, 2020

(87) PCT Pub. No.: WO2019/160320
PCT Pub. Date: Aug. 22, 2019

(65) Prior Publication Data
US 2021/0000322 A1  Jan. 7, 2021

(30) Foreign Application Priority Data
Feb. 13, 2018 (KR) .......................... 10-2018-0017929

(51) Int. Cl.
*A47L 15/10* (2006.01)
*A47L 15/42* (2006.01)
*A47L 15/48* (2006.01)

(52) U.S. Cl.
CPC ........... *A47L 15/10* (2013.01); *A47L 15/4278* (2013.01); *A47L 15/488* (2013.01)

(58) Field of Classification Search
CPC .. A47L 15/00; A47L 15/0023; A47L 15/0026; A47L 15/0028; A47L 15/10;
(Continued)

(56) References Cited

FOREIGN PATENT DOCUMENTS

DE  102008024322  11/2009
EP  684069 A1 * 11/1995  ............ B01F 5/0471
(Continued)

OTHER PUBLICATIONS

Machine Translation of Lee, WO 2018026221 A1, Feb. 2018. (Year: 2018).*
(Continued)

*Primary Examiner* — David G Cormier
(74) *Attorney, Agent, or Firm* — Fish & Richardson P.C.

(57) ABSTRACT

A dishwasher includes a tub; an injection module; a sump for supplying washing water to the injection module; a washing pump; and an air jet generator configured to form air bubbles in the washing water and to discharge the washing water to the sump. The air jet generator forms a flow path perpendicular to a bottom surface of the tub and includes a decompression portion for depressurizing washing water and a pressing portion for pressing the washing water; an air crushing pipe having an air inlet hole to introduce external air; an air tap for crushing air in the washing water discharged from the air crushing pipe; and an air chamber disposed outside the air crushing pipe and forming a space for introducing air therein, and having an air inlet hole for communicating with the inside of the air crushing pipe at one side of the lower portion.

15 Claims, 15 Drawing Sheets

(58) Field of Classification Search
CPC ............ A47L 15/4214; A47L 15/4219; A47L 15/4225; A47L 15/424; A47L 15/4246
See application file for complete search history.

(56) References Cited

FOREIGN PATENT DOCUMENTS

| | | |
|---|---|---|
| FR | 1238984 | 8/1960 |
| JP | 2008086868 | 4/2008 |
| JP | 2008119151 | 5/2008 |
| JP | 2016129634 | 7/2016 |
| KR | 100798994 | 1/2008 |
| KR | 20160116878 | 10/2016 |
| WO | WO2018026221 | 2/2018 |
| WO | WO2018026227 | 2/2018 |

OTHER PUBLICATIONS

Machine Translation of Muschelknautz et al., EP-684069-A1, Nov. 1995. (Year: 1995).*
Extended European Search Report in European Appln. No. 19755195.5, dated Oct. 29, 2021, 9 pages.
International Search Report in International Appln. No. PCT/KR2019/001750, dated Jun. 3, 2019, 5 pages (with English translation).
Office Action in Korean Appln. No. 10-2018-0017929, dated Dec. 27, 2021, 11 pages (with English translation).

\* cited by examiner

DISHWASHER

CROSS-REFERENCE TO RELATED APPLICATIONS

This application is a National Stage application under 35 U.S.C. § 371 of International Application No. PCT/KR2019/001750, filed on Feb. 13, 2019, which claims the benefit of Korean Application No. 10-2018-0017929, filed on Feb. 13, 2018. The disclosures of the prior applications are incorporated by reference in their entirety.

TECHNICAL FIELD

The present invention relates to a dishwasher, and more particularly, to a dishwasher including an air jet generator for forming microbubbles in washing water.

BACKGROUND ART

In general, a dishwasher is a household appliance that washes food waste on a surface of dishes by washing water of a high pressure injected from an injection nozzle.

The conventional dishwasher is configured with a tub in which a washing chamber is formed therein and a sump mounted in the bottom of the tub to store washing water.

Here, by a pumping action of a washing pump mounted inside the sump, the washing water is moved to an injection nozzle, and the washing water moved to the injection nozzle is injected at a high pressure through an injection port formed at the end of the injection nozzle. The washing water injected at the high pressure hits a surface of the dish, and thus dirt such as food waste on the dish falls to the bottom of the tub.

A filter is disposed between the sump and the tub, and the filter filters foreign substances contained in the washing water.

The dishwasher uses mechanical power to wash by injecting washing water through a nozzle of a dishwasher arm and decontamination power of detergent using a chemical reaction between detergent and contamination with a method for decontaminating dishes.

Korean Patent Laid-Open No. 10-2013-0071355 discloses a separate electrolysis unit to generate microbubbles in gas in an electrolysis process to increase the washing power, but this has a problem that requires a separate electrolysis device and that requires to operate the electrolysis device independently of the pump.

DISCLOSURE

Technical Problem

A first problem to be solved by the present invention is to provide a dishwasher that forms microbubbles in flowing washing water without a separate electric device.

A second problem of the present invention is to provide a dishwasher that can easily remove dirt when an air tap is blocked by dirt existing in washing water passing through an air jet generator including an air crushing pipe and an air tap so as to form microbubbles.

When microbubbles are formed and discharged into the tub, there is also an effect of washing the bottom surface of the tub. However, when washing water in which microbubbles are formed is discharged in only one direction of the tub, a problem may occur in which contaminants accumulate at the bottom surface of a corner portion of the tub. Therefore, a third problem to be solved by the present invention is to provide a dishwasher that prevents contaminants from accumulating in the corner portion of the tub. A fourth problem to be solved by the present invention is to provide a dishwasher that minimizes a vibration generating in a process of crushing air with an air jet generator.

A fifth problem to be solved by the present invention is to provide a dishwasher that reduces noise generating in a process of forming microbubbles.

However, when a space for reducing noise generating in a process of forming microbubbles is formed, a problem may occur that washing water is introduced and pooled in the space. Therefore, a sixth problem to be solved by the present invention is to provide a dishwasher that prevents washing water from introducing into the space to reduce the noise and that prevents washing water from being pooled even if washing water is introduced.

The problems of the present invention are not limited to the problems mentioned above, and other problems that are not mentioned will be clearly understood by those skilled in the art from the following description.

Technical Solution

In order to solve the first problem, a dishwasher according to the present invention includes a tub; an injection module for injecting washing water toward dishes; a sump for supplying washing water to the injection module; a washing pump for feeding the washing water stored in the sump to the injection module; and an air jet generator for receiving some of the washing water fed from the washing pump to form air bubbles in the washing water and to discharge the washing water to the sump, wherein the air jet generator includes an air crushing pipe including a decompression portion for depressurizing the flowing washing water, a pressing portion for pressing the washing water flowing downstream of the decompression portion, and an air inlet hole formed to introduce external air in downstream of the decompression portion, and an air tap for crushing the air existing in the washing water discharged from the air crushing pipe, and wherein the air crushing pipe forms a flow path rising at a bottom surface of the tub to form air bubbles in washing water flowing upward and to supply the washing water with air bubbles to the tub.

Further, the air jet generator may further include an impeller for applying a centrifugal force to the washing water flowing to the decompression portion, thereby applying a centrifugal force to the washing water flowing to the air crushing pipe to be advantageous in crushing air introduced into the air inlet hole.

The dishwasher further includes a nozzle connected to the air tap to discharge the washing water that has passed through the air tap to the tub, and the air jet generator further includes an air tap fixing member coupled to the air tap and detachably mounted in the air crushing pipe, and the air tap fixing member is coupled to the nozzle, and the nozzle may be easily separated from the air crushing pipe to solve the second problem. Further, the nozzle to which the air tap fixing member is coupled is mounted in the air crushing pipe at the upper side of the tub.

The nozzle forms an inflow hole for introducing the washing water that has passed through the air tap downward, and a plurality of discharge holes for discharging the washing water introduced into the inflow hole into the tub are formed at an upper circumferential surface of the nozzle to solve the third problem.

In order to solve the third problem, the nozzle of the dishwasher according to the present invention has a cylindrical shape, and a plurality of discharge holes for discharging washing water are formed at regular intervals at the circumferential surface thereof and thus the washing water may be discharged even to corners of the tub.

In order to solve the fourth problem, the air crushing pipe of the dishwasher according to the present invention includes a lower fixing plate disposed under the bottom surface of the tub to limit an upward movement of the air crushing pipe and an upper fixing portion fastened to an air crushing pipe fixing ring disposed at the upper side of the bottom surface of the tub to limit a downward movement of the air crushing pipe, thereby fixing the air crushing pipe to the tub to reduce a vibration generating in the air crushing pipe.

In order to solve the fifth problem, the dishwasher according to the present invention includes an air chamber disposed outside the air crushing pipe and for forming a space for introducing air therein and having an air inlet hole communicating with inside of the air crushing pipe at one side of a lower portion, thereby forming microbubbles in the washing water, and the washing water does not pooled inside the air chamber to reduce noise generating in a process of forming microbubbles.

In order to solve the fifth and sixth problems, the air chamber of the dishwasher according to the present invention includes a first pipe extended inward along a lower surface from the air inlet hole therein, thereby guiding the washing water inside the air chamber to the air crushing pipe and extending a noise propagation path flowing inside the air chamber.

In order to solve the fifth and sixth problems, the air chamber of the dishwasher according to the present invention has an external air inlet hole for introducing external air into an inner space of the air chamber, and the external air inlet hole is formed at an upper surface of a surface opposite to a surface in which the air inlet hole is formed to extend a propagation path of noise inside the air chamber.

In order to solve the fifth and sixth problems, the air chamber of the dishwasher according to the present invention includes a second pipe formed along an upper surface at the external air inlet hole therein, thereby extending a propagation path of noise therein.

The air chamber of the dishwasher according to the present invention includes a chamber body protruded in an outward direction from a circumferential surface of the air crushing pipe in which the air inlet hole is formed and forming a space inside and having an opened one side; and a chamber cover for covering an opened one side of the chamber body and having an external air inlet hole for introducing external air into the inside space of the air chamber, thereby forming a space inside the air chamber.

In order to solve the fifth and sixth problems, the dishwasher according to the present invention further includes an inner rib for extending a flow path of air inside the air chamber, thereby extending a path in which noise is propagated in the air chamber.

Specific details of other embodiments are included in the detailed description and drawings.

Advantageous Effects

According to a dishwasher of the present invention, there are one or more of the following effects.

First, because an air jet generator of the dishwasher according to the present invention branches some of washing water supplied from a pump and generates air bubbles in washing water through a branched flow, when a pump of the dishwasher for washing dishes is driven, there is an advantage that air bubbles constantly occur.

Second, the dishwasher according to the present invention has an advantage in that an air tap is detachably mounted in an air crushing pipe and that dirt caught in the air tap can be thus easily removed.

Third, a nozzle disposed at the upper side of the air crushing pipe is formed in a cylindrical shape, and discharge holes are formed at regular intervals at a circumferential surface thereof, and thus washing water with microbubbles can be injected even into a corner direction of the tub, and accumulation of contamination that may occur at the bottom surface of the tub can be thus prevented.

Fourth, because the air crushing pipe in which microbubbles are formed has a structure mounted and fastened to the bottom surface of the tub, there is an advantage of reducing a vibration generating in a process of forming microbubbles.

Fifth, an air chamber is provided at a portion in which air is introduced into the air crushing pipe, and thus there is an advantage of reducing noise generating as air is introduced and crushed.

Sixth, by reducing a noise generating in an air jet generator forming microbubbles and forming an air inlet hole in the lower side of an air chamber to reduce the noise, there is an advantage of preventing water from pooling in the air chamber.

The effects of the present invention are not limited to the above-mentioned effects, and other effects that are not mentioned will become apparent to those skilled in the art from the description of the claims.

MODE FOR INVENTION

Figure 1:
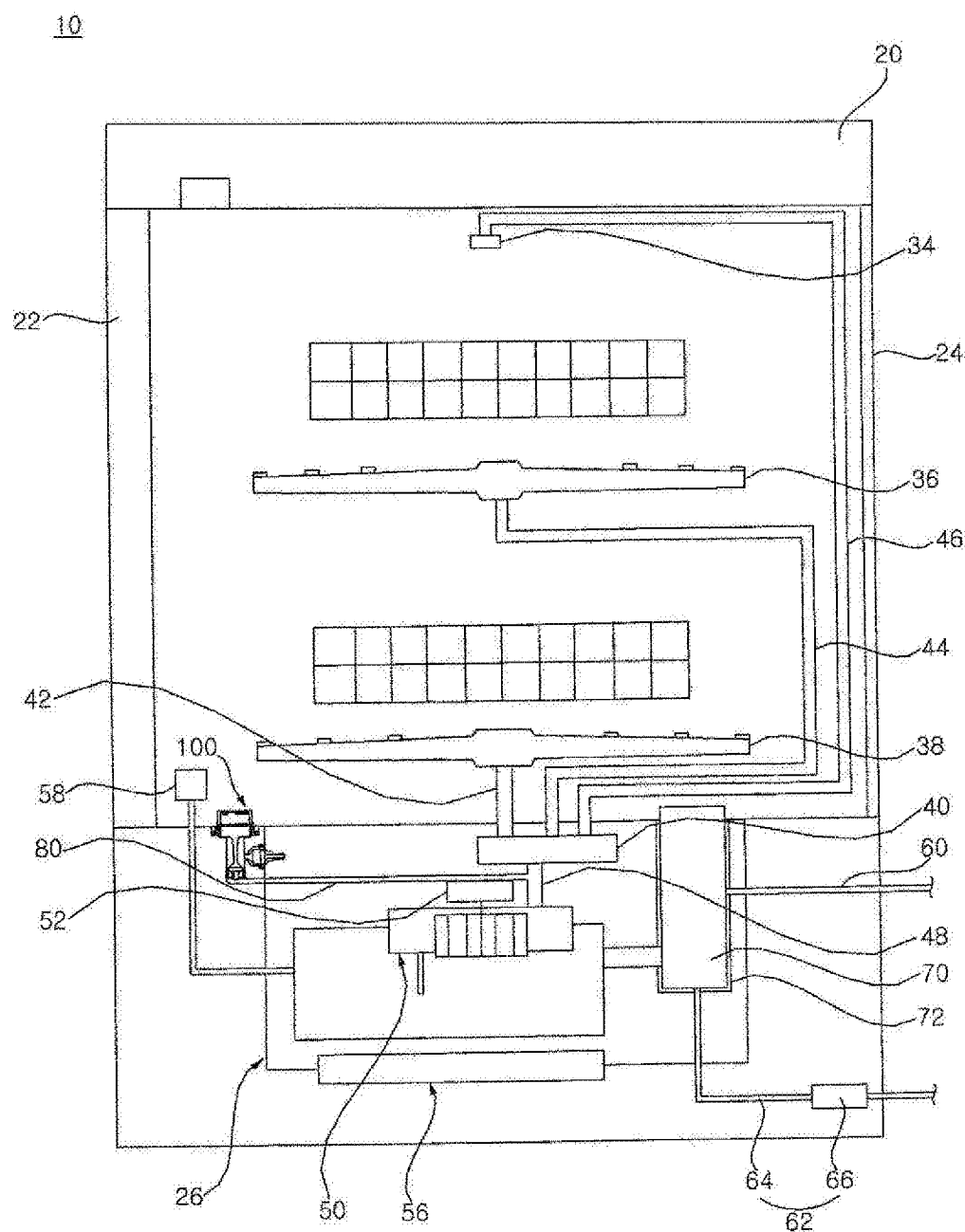
FIG. 1 is a schematic front cross-sectional view of a dishwasher according to an embodiment of the present invention.

Advantages and features of the present invention, and methods for achieving them will be clarified with reference to embodiments described below in detail together with the accompanying drawings. However, the present invention is not limited to the embodiments disclosed below, but may be implemented in various different forms, and only these embodiments are provided to make the disclosure of the present invention complete, and to fully inform the scope of the invention to those skilled in the art to which the present invention pertains, and the present invention is only defined by the scope of the claims. The same reference numerals refer to the same components throughout the specification.

Hereinafter, the present invention will be described with reference to drawings for explaining a dishwasher according to embodiments of the present invention.

<Overall Structure of Dishwasher>

Hereinafter, a configuration of a dishwasher according to embodiments of the present invention and the flow of washing water inside the dishwasher during dishwashing will be described with reference to FIGS. 1 and 2.

Referring to FIG. 1, a dishwasher 10 according to the present embodiment includes a cabinet 20 for forming an outer shape, a door 22 coupled to the cabinet 20 to open and close the inside of the cabinet 20, and a tub 24 installed inside the cabinet 20 and to which washing water or steam is applied.

The dishwasher 10 according to the present embodiment may include a dispenser (not shown) for storing detergent injected by a user and injecting the detergent into the tub 24 in a washing step. The dispenser may be disposed at the door 22.

The tub 24 is a space that disposes dishes so as to wash dishes. The tub 24 according to the present embodiment may form an air guide hole (not shown) at one side so as to reduce a pressure by discharging air to the outside when a pressure increases inside.

The dishwasher 10 according to the present embodiment includes racks 30 and 32 for receiving dishes inside the tub 24, an injection module 33 for injecting washing water toward the dishes received in the racks 30 and 32, a sump 26 for supplying washing water to the injection module 33, and a washing pump 50 for feeding washing water stored in the sump 26 to the injection module 33.

The injection module 33 is for injecting washing water toward dishes and includes injection nozzles 34, 36, and 38 and supply pipes 42, 44, and 46 for connecting the washing pump 50 and the injection nozzles 34, 36, and 38.

The dishwasher 10 further includes a washing motor 52 for driving the washing pump 50, and the washing motor 52 may be a brushless direct current motor (BLDC motor) capable of controlling the number of revolutions. Because the washing motor 52 is a BLDC motor, it is possible to set a target revolution per minute (RPM). When the RPM of the BLDC motor is changed, a pressure feeding force of the washing pump 50 is changed.

The dishwasher 10 according to the present embodiment may further include a water supply module 60 for supplying water to the sump 26 or the injection module, a drainage module 62 connected to the sump 26 to discharge washing water to the outside, a filter module 70 installed in the sump 26 to filter washing water, and a heating module 56 installed in the sump 26 to heat washing water.

Racks 30 and 32 for receiving washing targets such as dishes are provided inside the tub 24. In the present embodiment, the dishwasher 10 may include at least one rack 30 and 32. The racks 30 and 32 according to the present embodiment include a lower rack 32 disposed at a lower portion inside the tub 24 and an upper rack 30 disposed over the lower rack 32.

The dishwasher 10 according to the present embodiment may include at least one injection nozzle 34, 36, and 38. The dishwasher 10 according to the present embodiment includes a lower nozzle 38 provided inside the tub 24 to wash a washing target received in the lower rack 32, an upper nozzle 36 for washing a washing target received in the upper rack 30, and a top nozzle 34 positioned at the top of the tub 24 to inject washing water.

The supply pipes 42, 44, and 46 according to the present embodiment connect the sump 26 and the injection nozzles 34, 36, and 38. When the washing pump 50 operates to pump washing water stored in the sump 26, the washing water is supplied to the injection nozzles 34, 36 and 38. The supply pipes 42, 44, and 46 according to the present embodiment include a first pipe 42 for supplying washing water to the lower nozzle 38, a second pipe 44 for supplying washing water to the upper nozzle 36, and a third pipe 46 for supplying washing water to the top nozzle 34.

The dishwasher 10 according to the present embodiment includes a flow path switching portion 40 for supplying the washing water stored in the sump 26 to the first pipe 42 to the third pipe 46.

The flow path switching portion 40 according to the present embodiment may include a flow path switching motor (not shown) for generating a rotational force and a rotating plate (not shown) for rotating by the flow path switching motor to control the flow of washing water. The rotating plate according to the present embodiment may selectively open and close a plurality of connectors (not shown) formed at a location in which a plurality of supply pipes 42, 44, and 46 are branched. A plurality of switching holes (not shown) may be formed in the rotating plate. The rotating plate rotates step by step by the flow path switching motor. When the rotating plate rotates by the flow path switching motor, a plurality of switching holes formed in the rotating plate are positioned at a location corresponding to at least one of the plurality of connectors, and thus washing water flowing from the washing pump 50 may be injected toward at least one of a plurality of injection nozzles 34, 36, and 38.

The washing water discharged from the sump 26 through the washing pump 50 moves to the flow path switching portion 40 through the pump pipe 48. The flow path switching portion 40 may supply the washing water introduced from the sump to at least one of the first pipe 42 to the third pipe 46.

The upper nozzle 36 may be positioned under the upper rack 30. The upper nozzle 36 is preferably rotatably coupled to the second pipe 44 so that it may rotate by a repulsive force of washing water when injecting the washing water.

The top nozzle 34 is disposed at a position higher than that of the upper rack 30. The top nozzle 34 is disposed over the tub 24. The top nozzle 34 receives washing water from the third pipe 46 and injects the washing water to the upper rack 30 and the lower rack 32.

In the present embodiment, the injection nozzles 34, 36, and 38 may be configured to receive and inject washing water from the sump 26 in which washing water is stored.

The water supply module 60 is configured to receive water from the outside and to supply the water to the sump 26, and opens and closes the water supply valve 65 to supply external water into the sump 26. In the present embodiment, water is supplied to the sump 26 through the filter module 70. The drainage module 62 is for discharging washing water stored in the sump 26 to the outside and is configured with a drainage flow path 64 and a drainage pump 66.

The filter module 70 is for filtering foreign substances such as food waste contained in the washing water, and is disposed in a flow path of washing water introduced from the tub 24 to the sump 26.

To this end, in the sump 26, a filter mounting portion 72 in which the filter module 70 is installed may be formed, and a filter flow path for connecting the filter mounting portion and the inside of the sump 26 may be disposed.

The sump 26 is connected to the steam nozzle 58 for ejecting steam generated by the heating module 56 into the tub 24 through a steam flow path, and in the steam flow path, a valve (not shown) that regulates steam may be installed, and steam injected into the tub 24 may be regulated through the valve, and an amount of steam according to the case may be adjusted.

Here, the steam generated in the sump 26 may be supplied into the tub 24 through the filter flow path and the filter mounting portion 72 instead of the steam nozzle. The sump 26 may be connected in both directions to the tub 24 through a steam flow path and a filter flow path.

The dishwasher according to the present embodiment may include a water level detecting unit that detects a water level in the tub. The water level detecting unit according to the present embodiment is equipped with a floater (not shown) for detecting a water level in the tub 24, and includes a water level detecting sensor (not shown) that senses a water level by sensing a rising height of the plotter.

The dishwasher according to the present embodiment may further include an input unit (not shown) that receives a command from a user, and a display unit (not shown) that displays the progress of the dishwasher or displays a notification to the user. The input unit may use a touch input method or a button input method, and the display unit may use a display or a warning lamp.

The dishwasher according to the present embodiment includes an air jet generator 100 that forms an air bubble of a fine size in washing water.

The dishwasher according to the present embodiment supplies some of the washing water flowing by the washing pump 50 to the air jet generator 100 in addition to the injection module 33 through a branch pipe 80. The air jet generator 100 supplies washing water through a flow path branched from the washing pump 50, introduces air into the supplied washing water, and crushes the introduced air to generate fine air bubbles. The air jet generator 100 is connected to the tub 24 or the sump 26. Accordingly, when the pump is operated, washing water in which air bubbles are generated by the air jet generator 100 is supplied into the sump 26, and the washing water fed to the injection module 33 includes air bubbles.

A lower hole (not shown) formed so that an upper portion of the air jet generator 100 penetrates is formed at the bottom of the tub 24. An upper portion of the air crushing pipe 110 of the air jet generator 100 to be described below penetrates the lower hole. Accordingly, a part of the upper portion of the air crushing pipe 110 of the air jet generator 100 is disposed at the upper side of the tub 24.

<Flow of Washing Water Inside Dishwasher>

Figure 2:
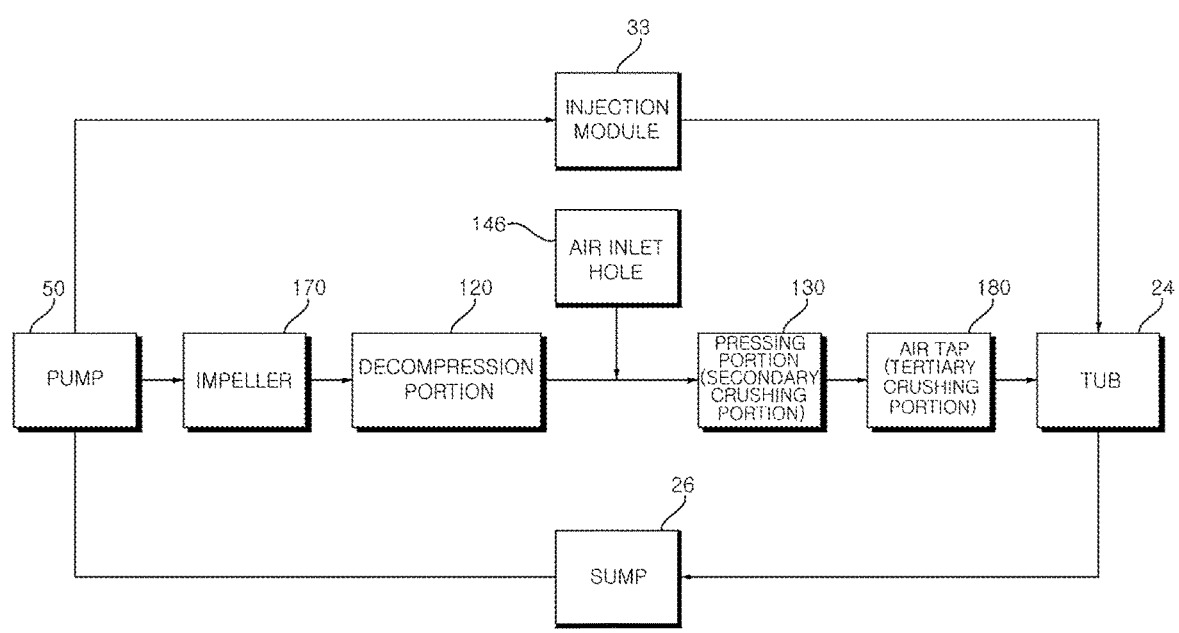
FIG. 2 is a schematic view for explaining the flow of washing water in a dishwasher according to an embodiment of the present invention.
Figure 3:
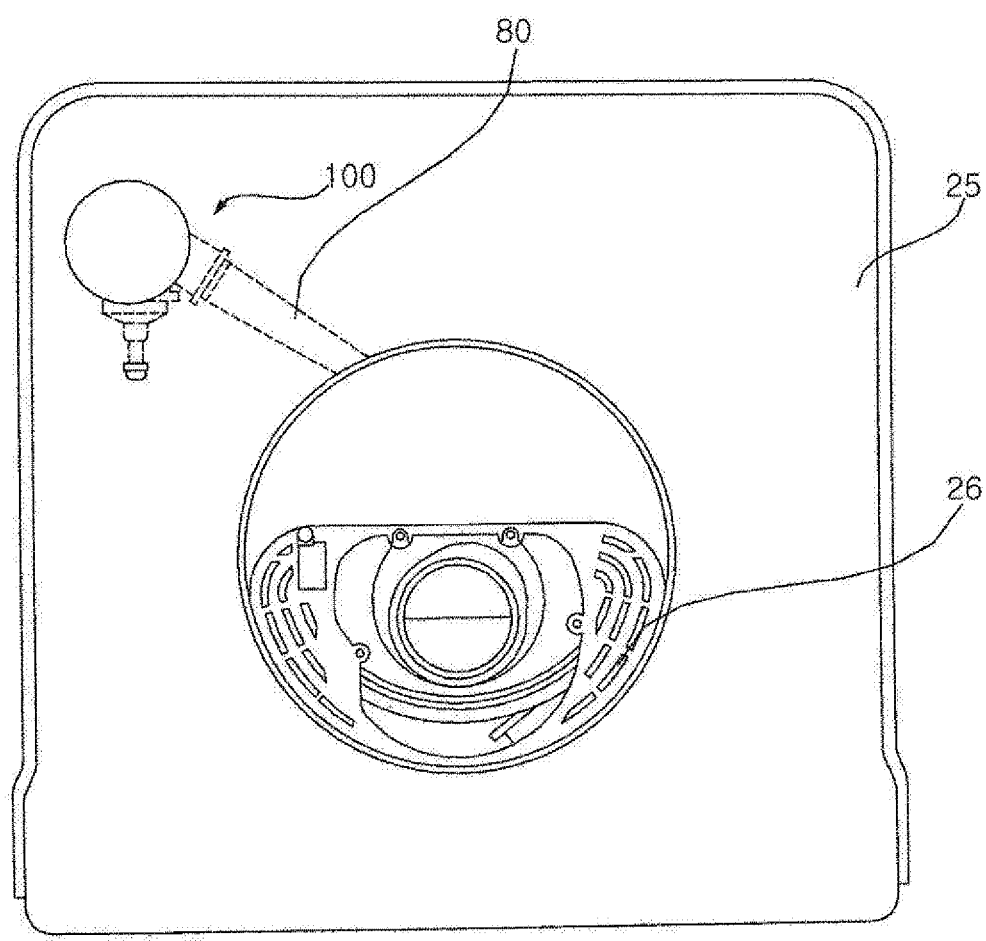
FIG. 3 is a diagram illustrating an air jet generator disposed inside a dishwasher according to an embodiment of the present invention.
Figure 4:
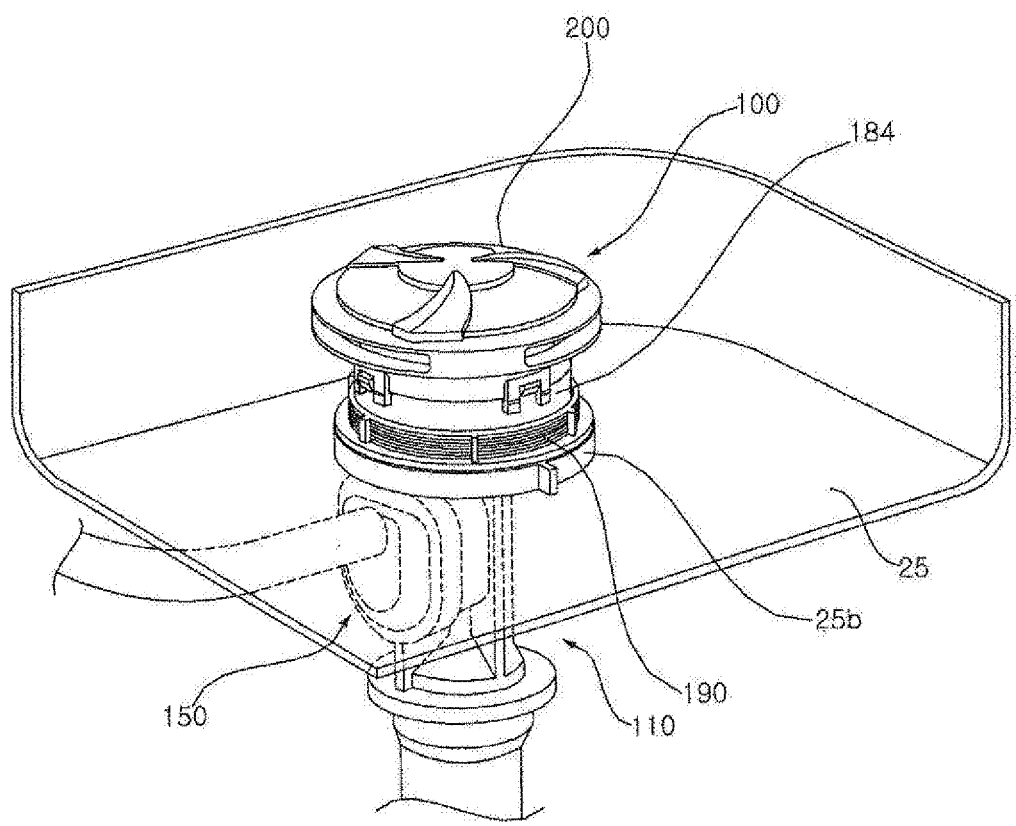
FIG. 4 is a diagram illustrating a state in which an air jet generator is mounted in a tub according to an embodiment of the present invention.

Referring to FIG. 2, the flow of the washing water will be described. The washing water stored in the sump 26 of the dishwasher 10 is supplied to the injection module 33 through the washing pump 50, and the washing water supplied to the injection module 33 is injected into the tub 24, and the washing water injected to the tub 24 is introduced again into the sump 26. In the dishwasher 10 according to the present embodiment, a portion of the washing water that has passed through the washing pump 50 is introduced into the air jet generator 100 that generates air bubbles in the washing water. A portion of the washing water flowing through the washing pump 50 is introduced to the air jet generator 100 through the branch pipe 80.

The air jet generator 100 is supplied with a portion of the washing water discharged from the washing pump 50. The air jet generator 100 enables the introduced wash water to pass through an impeller 170, an air inlet hole 146, an air crushing pipe 110 including a decompression portion 120 and a pressurization portion 130, and an air tap 180 to generate air bubbles in the wash water. That is, the washing water introduced into the air jet generator 100 flows in a spiral by the impeller 170. Thereafter, washing water has an increased speed while passing through the decompression portion 120, and the air introduced into the air inlet hole is primarily crushed by the washing water rotating at a high speed by the impeller 170 and the decompression portion 120. Further, the washing water is secondarily crushed while passing through the pressing portion 130. Further, the washing water is crushed thirdly while passing through the air tap 180 to include an air bubble of a fine size.

The washing water including the air bubble is introduced again into the sump 26. Washing water including air bubbles may be discharged to the tub 24 and introduced into the sump 26. Therefore, when the washing pump 50 is operated by the operation of the dishwasher 10, air bubbles are generated in the washing water. Hereinafter, the configuration and disposition of the air jet generator according to the present invention will be described with reference to FIGS. 3 to 13.

<Configuration of Air Jet Generator>

The air jet generator 100 according to the present embodiment is disposed behind the bottom surface 25 of the tub 24. The air jet generator according to the present embodiment may be disposed at the corner side of the bottom surface 25 of the tub 24.

Figure 9:
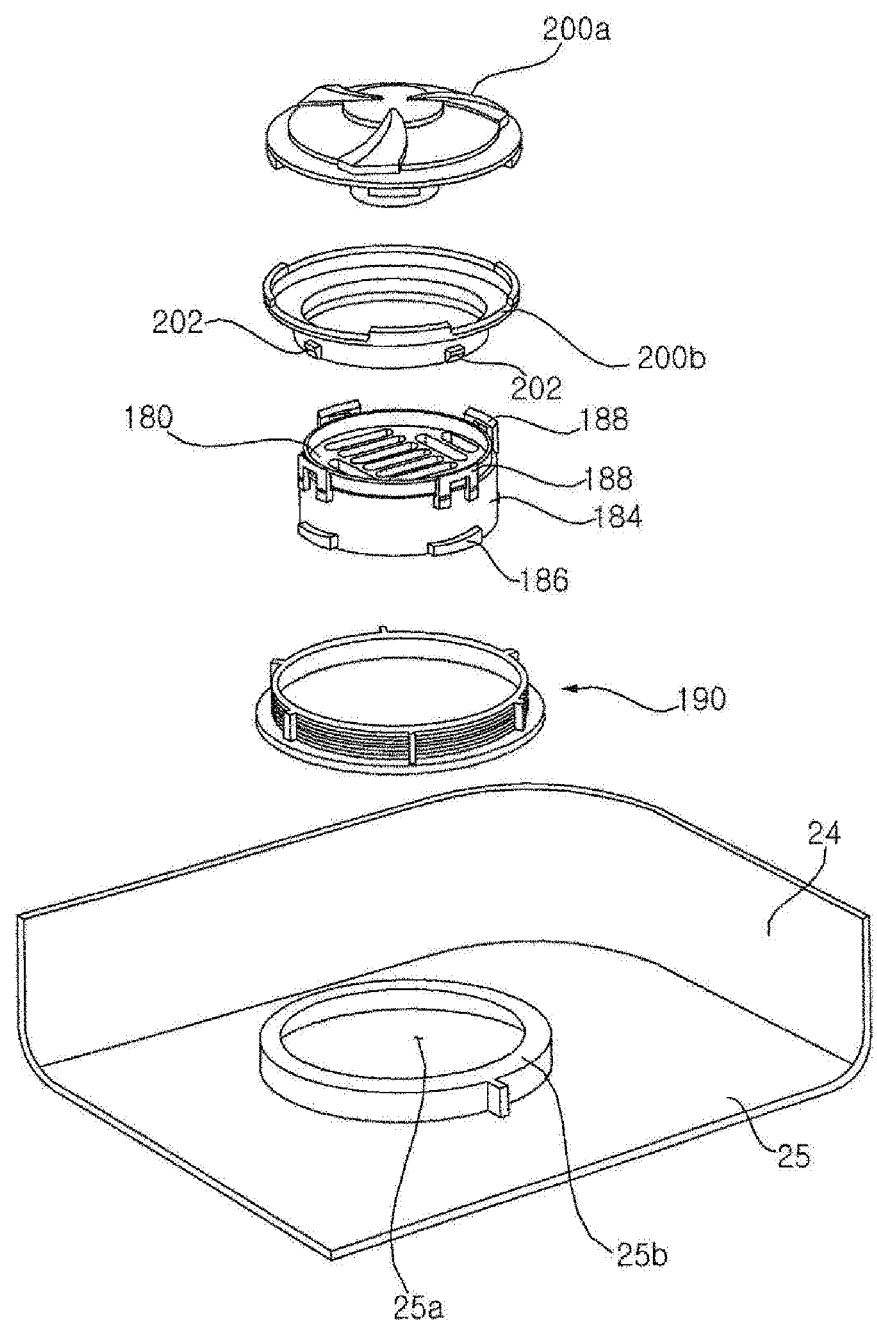
FIG. 9 is an exploded view of a configuration of an air jet generator disposed over the tub according to an embodiment of the present invention.
Figure 10:
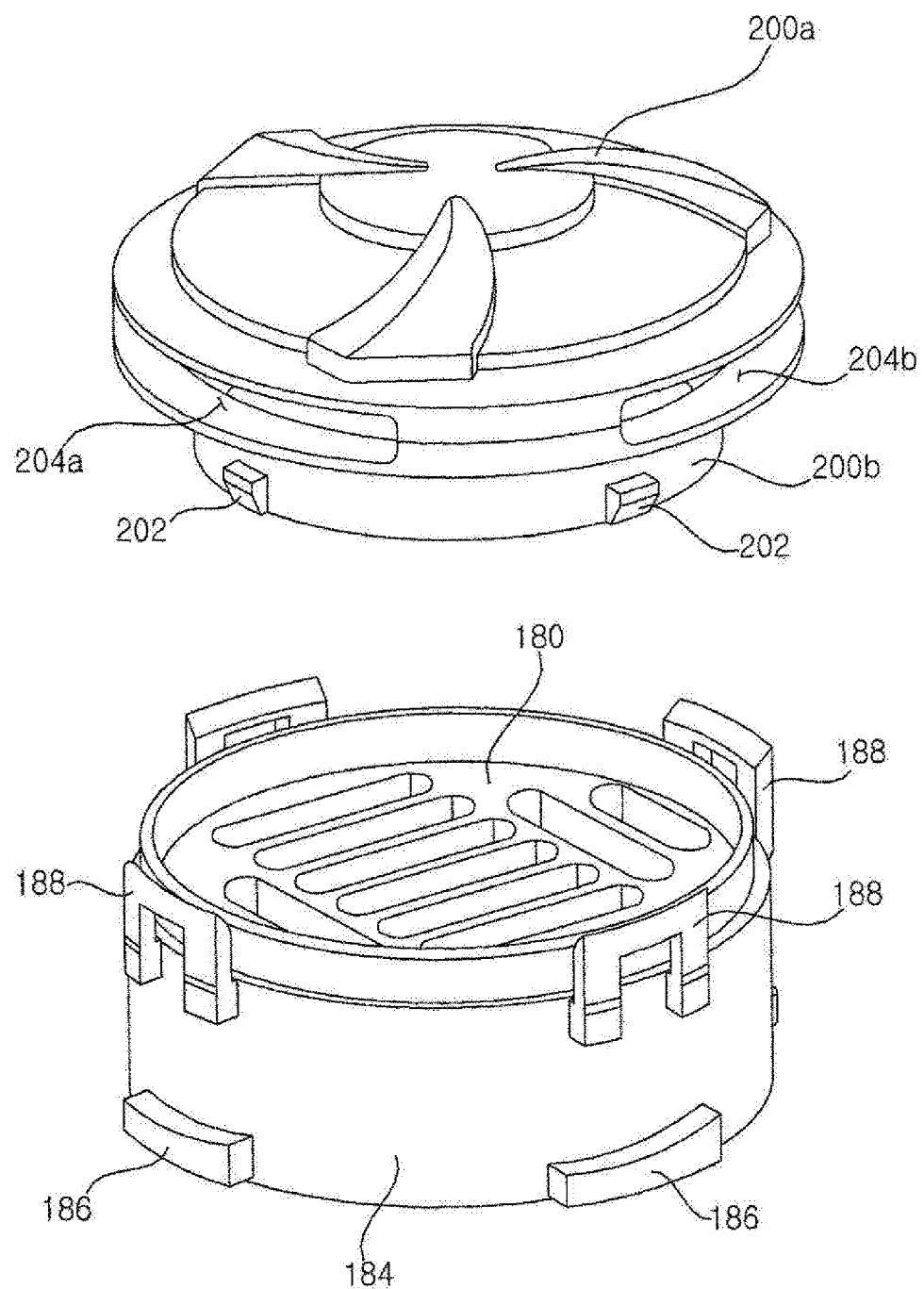
FIG. 10 is an exploded perspective view of an air tap fixing member equipped with a nozzle and an air tap according to an embodiment of the present invention.
Figure 11:
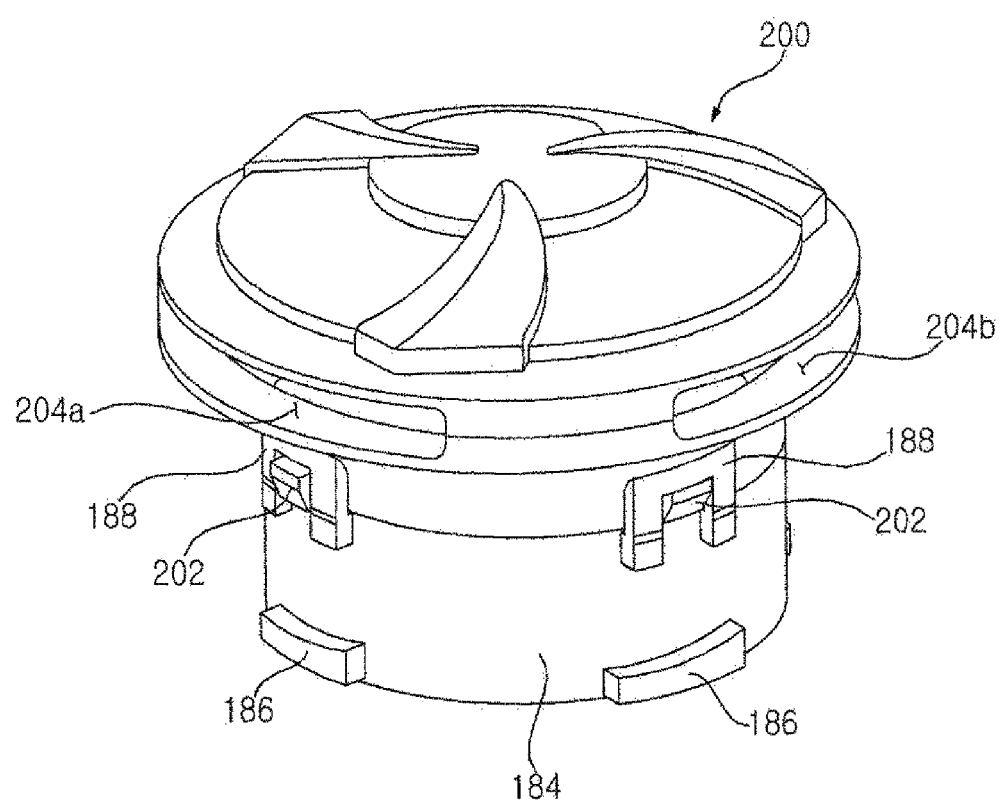
FIG. 11 is a perspective view of a coupled state of an air tap fixing member equipped with a nozzle and an air tap according to an embodiment of the present invention.
Figure 12:
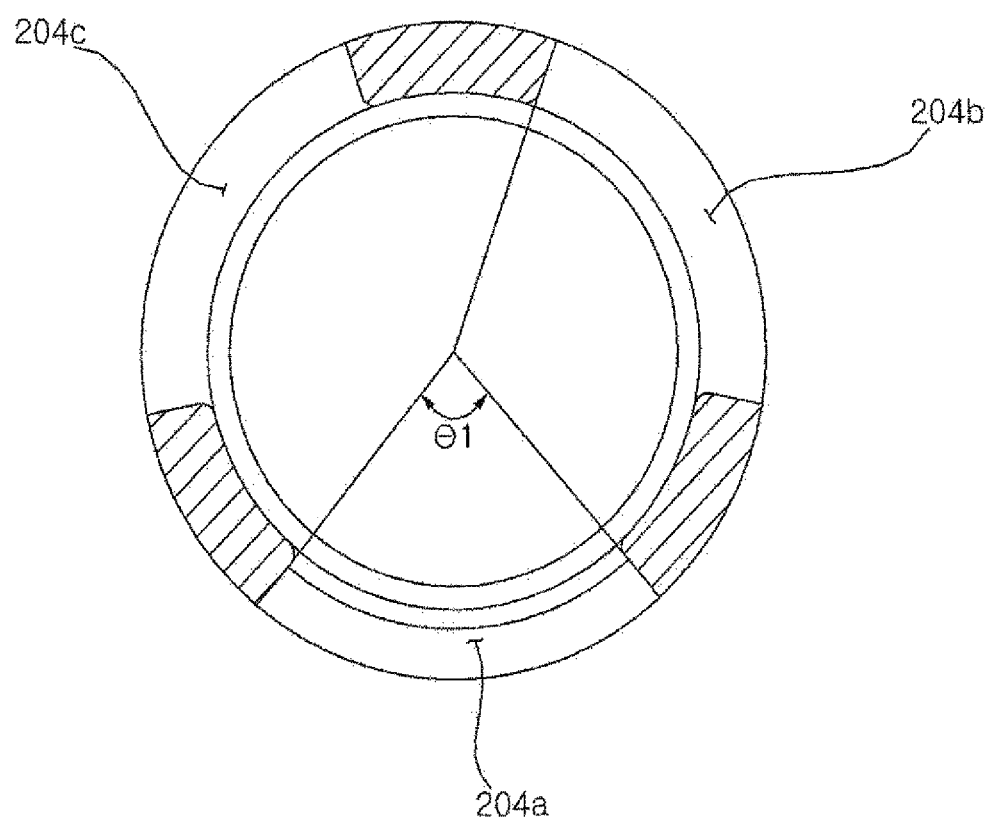
FIG. 12 is a diagram illustrating the size and disposition of a plurality of discharge holes formed in a nozzle according to an embodiment of the present invention.
Figure 13:
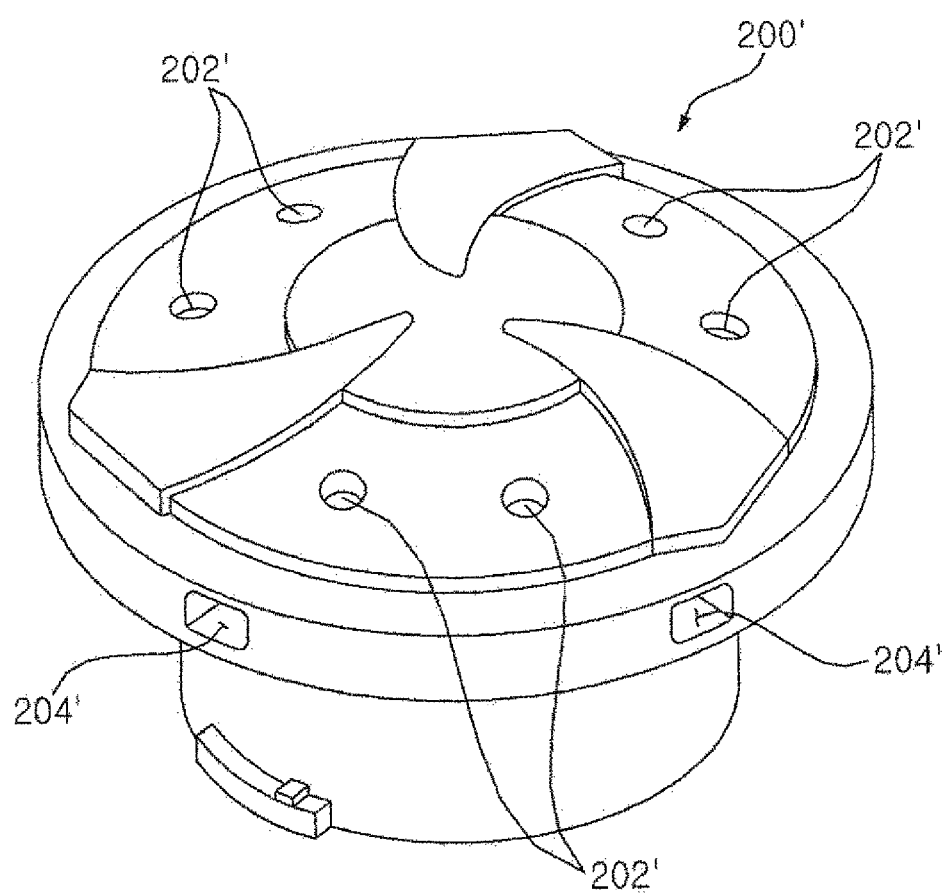
FIG. 13 is a perspective view of a nozzle according to another embodiment of the present invention.

Referring to FIG. 9, in the bottom surface 25 of the tub 24 according to the present embodiment, in a portion in which the air jet generator 100 is mounted, a mounting hole 25*b* for penetrating a partial configuration of the air jet generator 100 is formed, and a mounting surface 25*b* in which the air jet generator 100 is mounted is formed around the mounting hole 25*b*.

At the upper side of the mounting surface 25*b*, a fixing ring 190 to be described below is disposed. The mounting surface 25*b* forms a flat surface so as to be in close contact with the lower side of the fixing ring 190.

The air jet generator according to the present embodiment forms a flow path perpendicular to the bottom surface 25 of the tub 24 or the ground and includes a decompression portion 120 for decompressing the flowing washing water, a pressing portion 130 for pressurizing the washing water that flows downstream of the decompression portion 120, an air crushing pipe having an air inlet hole for introducing external air in downstream of the decompression portion, an air tap 180 for crushing the air existing in the washing water discharged from the air crushing pipe, and an air chamber 150 disposed outside the air crushing pipe and forming a space for introducing air inside, and having an air inlet hole communicating with the inside of the air crushing pipe at one side of the lower portion. Further, the air jet generator according to the present embodiment may further include an impeller 170 for applying a centrifugal force to the washing water flowing to the air crushing pipe.

The dishwasher 10 according to the present embodiment further includes a branch pipe 80 for flowing some of the washing water flowing from the washing pump 50 to the injection module 33 to the air jet generator 100. The branch pipe 80 is coupled to the lower portion of the air crushing pipe 110 at an end portion. The branch pipe 80 and the air crushing pipe 110 may be coupled by a fusion method.

The branch pipe 80 sends some of the washing water flowing through the pump pipe 48 to the air jet generator 100. That is, the branch pipe 80 is branched from the pump pipe 48 to be connected to the air jet generator 100.

In the branch pipe 80 according to the present embodiment, an impeller 170 that applies a centrifugal force to the washing water introduced into the air crushing pipe 110 may be disposed. An impeller mounting portion 82 in which the impeller 170 is mounted may be formed inside the one side of the branch pipe 80 according to the present embodiment. The impeller 170 may be coupled to the impeller mounting portion 114 of the branch pipe 80 by a fusion method.

The impeller 170 according to the present embodiment includes a cylindrical impeller circumference 172 and a vane 174 disposed inside the impeller circumference 172 to form a swirling flow in the washing water. The impeller 170 is disposed so that an outer surface of the impeller circumference 172 abuts on the inside of the discharge end of the branch pipe 80. The washing water passing through the impeller 170 rotates as it passes through the vane 174 to generate a swirl flow.

The vane 174 of the impeller 170 applies a centrifugal force to the washing water flowing to the decompression portion 120. The vane 174 of the impeller 170 may be fixed or rotated, and the washing water passing through the vane 174 rotates and is introduced into the air crushing pipe 110.

The air crushing pipe 110 according to the present embodiment crushes the air introduced into flowing washing water. The air crushing pipe according to the present embodiment has a decompression portion that reduces a cross-sectional area of a flow path in the direction of washing water so as to reduce a pressure of washing water flowing therein, an air introducing hole that introduces the outside air to the inside of the air crushing pipe with a negative pressure generated in the pipe in a downstream portion of the decompression portion, and a pressing portion that increases a cross-sectional area of the flow path in the direction of the washing water so as to pressurize the washing water including air. The air crushing pipe 110 according to the present embodiment is disposed under the bottom surface 25 of the tub 24. The air crushing pipe 110 according to the present embodiment is disposed perpendicular to the ground or the bottom surface 25 of the tub 24.

The air crushing pipe 110 disposes in the order of a decompression portion, a pressing portion, and an air tap mounting portion 116 in a direction in which the washing water flows.

The air crushing pipe 110 further includes an air tap mounting portion 116 in which the air tap 180 is mounted at the discharge end in which washing water is discharged. The air tap mounting portion 116 has a shape enclosing the air tap 180 or the air tap fixing member 184 so that the air tap 180 and the air tap fixing member 184 are inserted. The air tap mounting portion 116 is disposed over the air crushing pipe.

The size of the inlet cross-section of the decompression portion 120 is formed smaller than that of a discharge cross-section of the pressing portion. The air crushing pipe 110 according to the present embodiment is disposed perpendicular to the ground or the bottom surface of the tub 24. The flow path formed inside the air crushing pipe 110 according to the present embodiment is formed perpendicular to the ground or the bottom surface of the tub 24.

The decompression portion 120 according to the present embodiment is disposed under the pressing portion 130. The decompression portion 120 according to the present embodiment is formed upstream of the pressing portion 130. The decompression portion 120 according to the present embodiment is formed by reducing a cross-sectional area of a flow path in the direction of washing water. A length of the flow path formed by the decompression portion 120 is smaller than that of the flow path formed by the pressing portion 130. The size of the flow path diameter D1 at the inlet end of the decompression portion 120 is formed smaller than the flow path diameter D2 at the discharge end of the pressing portion 130.

The decompression portion 120 according to the present embodiment may be divided into a first decompression portion 122 for primarily rapidly depressurizing washing water introduced into the air crushing pipe 110 and a second decompression portion 124 disposed downstream of the first decompression portion 122 to increase or maintain a flow rate of the washing water introduced through the first decompression portion 122. The first decompression portion 122 according to the present embodiment has a rapidly decreasing flow path cross-sectional area as advancing from the upstream to the downstream. The first decompression portion 122 according to the present embodiment may have a largely reducing ratio of the flow path cross-sectional area, compared with the second decompression portion 124. The washing water flowing the decompression portion 120 of the air crushing pipe 110 may have a decreasing pressure while passing through the first decompression portion 122 and the second decompression portion 124 to form a negative pressure.

The air inlet hole 146 is formed in a portion in which the flow path cross-section of the decompression portion 120 reduces. The air inlet hole 146 is formed at downstream of the decompression portion 120. The air inlet hole 146 may be formed at a point in which decompression by the decompression portion 120 ends.

The air inlet hole 146 may be formed between the depressurization portion 120 and the pressurization portion 130. The air inlet hole 146 communicates the inside of the air crushing pipe 110 with the inside of the air chamber 150 to be described below. In the air crushing pipe 110 according to the present embodiment, external air may be introduced into the air crushing pipe 110 through the air inlet hole 146. Here, the outside refers to the outside of the air crushing pipe, and may be not only the outside of the cabinet 20 but also the inner space of the tub 24.

While washing water flowing the air crushing pipe 110 passes through the decompression portion, a pressure of washing water drops. Because the washing water that has passed through the decompression portion has a negative pressure due to decompression, external air may be sucked into the air crushing pipe 110 through the air inlet hole 146. The air introduced into the air crushing pipe 110 through the air inlet hole 146 is primarily crushed by a rotating flow flowing at a high speed along the decompression portion 120.

An air chamber 150 for reducing noise generating in the air crushing pipe 110 may be disposed at one side of the air crushing pipe 110 according to the present embodiment. The air chamber 150 reduces noise transferred to the outside through the air inlet hole 146.

The air chamber 150 according to the present embodiment forms a space in which noise is propagated therein. The air chamber 150 according to the present embodiment is disposed outside the air crushing pipe 110 in which the air inlet hole 146 is formed. In the air chamber 150 according to the present embodiment, an air inlet hole 146 that enables communication with the inside of the air crushing pipe 110 is formed at one side of the lower end portion. The air inlet hole 146 according to the present embodiment is formed at the lower end of the air chamber 150. Therefore, even if washing water is introduced into the air chamber 150, the washing water is drained into the air inlet hole 146 formed at the lower end of the air chamber 150, so that the washing water is not pooled inside the air chamber 150. In the air chamber 150 according to the present embodiment, an external air inlet hole 168 is formed in which external air is introduced into the air chamber 150. The external air inlet hole 168 according to the present embodiment is formed at the upper end of the air chamber 150. Therefore, the washing water introduced into the air chamber 150 may be prevented from escaping out of the air chamber 150.

The air chamber 150 according to the present embodiment is disposed outside the air crushing pipe 110 in which the air inlet hole 146 is formed. The air chamber 150 according to the present embodiment includes a chamber body 152 forming a space inside and having an opened one side and a chamber cover 154 for covering an opened one side of the chamber body 152.

The chamber body 152 according to the present embodiment is protruded from one side of the air crushing pipe 110 to form a space of the inside, and may be integrally formed with the air crushing pipe 110. Further, the chamber cover 154 may be formed as a separate configuration from the chamber body 152 and be coupled to the chamber body 152.

The chamber body 152 and the chamber cover 154 according to the present embodiment may be formed as separate configurations so as to communicate with an internal flow path of the air crushing pipe 110 and to form a space in which noise is propagated therein. Because the chamber body 152 and the chamber cover 154 are manufactured and coupled as separate configurations, a space inside the air chamber 150 may be secured. The chamber cover 154 may be coupled to the chamber body 152 by a fusion method.

The chamber body 152 according to the present embodiment is disposed at one side forming the circumference of the air crushing pipe 110 and thus a coupling process through a separate provision process may be omitted. The chamber body 152 according to the present embodiment may be disposed at one side forming the circumference of the air crushing pipe 110 to serve to reinforce rigidity of the air crushing pipe 110 together with the reinforcing protruding portion 112.

The chamber body 152 according to the present embodiment is formed at the outer circumference of the air crushing pipe 110 in which the air inlet hole 146 is formed. The air inlet hole 146 is formed at one side of the circumferential surface of the air crushing pipe in contact with the inner lower surface 155 of the chamber body 152. Therefore, residual water pooled in the chamber body 152 may flow to the air inlet hole 146. One side surface of the chamber body facing the air inlet hole 146 is opened. The chamber cover 154 is disposed at an opened side surface of the chamber body 152 facing the air inlet hole 146. The chamber cover 154 according to the present embodiment covers the opened one side surface of the chamber body 152. In the chamber cover 154 according to the present embodiment, an external air inlet hole 168 for introducing external air is formed. Further, the chamber cover 154 includes an external connection pipe 166 protruded outward from a portion in which the external air inlet hole 168 is formed. A separate connecting hose (not shown) that connects to the outside of the cabinet 20 may be mounted in the external connection pipe 166.

The air chamber 150 according to the present embodiment includes a first pipe 158 extended along the inner lower surface 155 of the air chamber 150 in the air inlet hole 146. The first pipe 158 may extend a path in which noise is propagated in the air chamber 150 to reduce noise. The first pipe 158 according to the present embodiment is formed at the inner lower surface 155 of the chamber body 152.

The air chamber 150 according to the present embodiment may include a second pipe 160 formed along the inner upper surface 156 of the air chamber 150 in the external air inlet hole 168. The second pipe 160 may extend a path in which noise is propagated in the air chamber 150 to reduce noise. The second pipe 160 according to the present embodiment may be formed by an upper surface of the chamber body 152 and the second pipe member 162 protruded into the air chamber 150 from the circumference of the external air inlet hole 168 of the chamber cover 154.

Referring to FIG. 7B, an inner rib 164 for extending a path in which air flows therein may be further formed in the air chamber 150 according to the present embodiment. The inner rib 164 according to the present embodiment is protruded from the outside of the air crushing pipe 110. The inner rib 164 according to the present embodiment may be protruded in a direction of the chamber cover 154 from the inside of the chamber body 152. Further, the inner rib protruded from the chamber cover 154 toward the chamber body 152 may be further formed.

The pressing portion 130 according to the present embodiment is disposed over the decompression portion 120. The pressing portion 130 according to the present embodiment is disposed at the downstream of the decompression portion 120. The pressing portion 130 increases a cross-sectional area of the flow path in a flow direction of washing water to pressurize the washing water. The washing water moving along the pressing portion 130 is pressurized, and thus the air in the washing water is secondarily crushed.

The pressing portion 130 is formed longer than the decompression portion 120. The pressing portion 130 according to the present embodiment may be divided into a first pressing portion that primarily pressurizes washing water introduced and flowing from the decompression portion and a second pressing portion that pressurizes secondly washing water passing through the first pressing portion 132. The first pressing portion gradually presses washing water, compared with the second pressing portion. The first pressing portion has a smaller rate of change of a flow path cross-sectional area than that of the second pressing portion. That is, referring to FIG. 6, a flow path length of the first pressing portion 132 is formed shorter than that of the second pressing portion 134, but the difference in the inner diameters of both ends of the first pressing portion 132 is formed smaller than that in the inner diameter of both ends of the second pressing portion 134.

In the first pressing portion 132, the air introduced into the air inlet hole 146 is crushed by a flow rate and a centrifugal force of flowing washing water. The second pressing portion 134 presses washing water by rapidly extending a cross-section of the flow path, thereby effectively crushing the air existing inside the washing water.

The pressing portion according to the present embodiment may further include an expansion pipe portion 136 that maintains a cross-section of the flow path extended through the second pressing portion 134. The expansion pipe portion 136 is connected to an inner circumferential surface 185 of the air tap fixing member 184 to be described below. The extension pipe portion 136 and the inner circumferential surface 185 of the air tap fixing member 184 may adjust a distance in which the air tap 180 is spaced from the air inlet hole 146. It is preferable that a distance H1 in which the air tap 180 is spaced from the air inlet hole 146 so as to effectively crush the air in the air tap 180 to be described later is equal to or larger than a diameter D2 of the air tap 180. Therefore, the sum H1 of flow path lengths formed by the first pressing portion 132, the second pressing portion 134, the expansion pipe portion 136, and the inner circumferential surface 185 of the air tap fixing member 184 is equal to or larger than a diameter D2 of the air tap 180.

The air crushing pipe 110 according to the present embodiment includes an air tap mounting portion 116 formed so that the air tap 180 is mounted in the upper side of the expansion pipe portion 136. The air tap mounting portion 116 may be formed in a size capable of mounting the air tap 180 therein. The air tap mounting portion 116 according to the present embodiment is formed in a size capable of mounting the air tap fixing member 184 mounted with the air tap 180 therein. The air tap fixing member 184 in which the air tap 180 is mounted may be detachably mounted in the air tap mounting portion 116. When the air crushing pipe 110 is mounted in the tub 24, the air tap mounting portion 116 is disposed over the air crushing pipe 110. The air tap mounting portion 116 is disposed downstream of the pressing portion 130 of the air crushing pipe 110 in a direction in which washing water flows.

The air tap mounting portion 116 is coupled to the air tap fixing member 184 in which the air tap 180 is mounted. The air tap mounting portion 116 has a fastening groove 117 corresponding to the fastening protrusion 186 of the air tap fixing member 184. The air tap mounting portion 116 is disposed over the bottom surface 25 of the tub 24.

The air crushing pipe 110 according to the present embodiment includes a tub mounting portion coupled to the bottom surface 25 of the tub 24. The tub mounting portion is formed at an outer circumference of the air crushing pipe 110 over the pressing portion 130. The tub mounting portion is formed at the outer circumferential surface of the air tap mounting portion 116. The tub mounting portion includes a lower fixing plate 138 protruded in a circumferential direction from the outer circumferential surface of the air crushing pipe 110, and an upper fixing portion 140 protruded upwardly from the bottom surface of the tub 24 and fastened to a fixing ring 190 to be described below.

The lower fixing plate 138 forms a ring shape protruded outward along the outer circumference of the air crushing pipe 110. The lower fixing plate 138 is disposed under the bottom surface of the tub 24. The lower fixing plate 138 is disposed opposite to the bottom surface 25 of the tub 24. The lower fixing plate 138 limits a movement of the air crushing pipe 110 to the upper side of the bottom surface 25 of the tub 24.

The upper fixing portion 140 is partially disposed over the bottom surface of the tub 24. The upper fixing portion 140 forms a thread so as to be fastened to the fixing ring 190 at the outer circumferential surface of the air crushing pipe 110. The bottom surface of the tub 24 is disposed between the lower fixing plate 138 and the fixing ring 190 fastened to the upper fixing portion 140. The upper fixing portion 140 is coupled to the fixing ring 190 to limit a movement of the air crushing pipe 110 downward.

The fixing ring 190 has a ring shape, and is fastened to the upper fixing portion 140 of the air crushing pipe 110. The inner circumferential surface 192 of the fixing ring 190 forms a thread corresponding to the upper fixing portion 140. The fixing ring 190 maintains rigidity thereof, and a plurality of reinforcing ribs 194 functioning as handles are formed at the outer circumference. The reinforcing ribs 194 are formed perpendicular to the outer circumferential surface of the fixing ring 190 at regular intervals.

The air crushing pipe 110 according to the present embodiment may be divided into an upper portion 119 disposed over the bottom surface 25 of the tub 24 and a lower portion 118 disposed under the bottom surface 25 of the tub 24. The upper portion 119 and the lower portion 118 of the air crushing pipe 110 may be divided based on the lower fixing plate 138 of the tub mounting portion. In the lower portion 118 of the air crushing pipe 110, a decompression portion 120, an air inlet hole 146, and a pressing portion 130 are disposed. An air tap mounting portion 116 is disposed at the upper portion 119 of the air crushing pipe 110.

The air crushing pipe 110 according to the present embodiment is fastened to the tub 24 between the pressing portion 130 and the air tap mounting portion 116 in which the air tap 180 is mounted. In the air crushing pipe 110 according to the present embodiment, a large amount of air is crushed in the pressing portion 130 and the air tap 180, and thus a vibration and noise may occur. However, because the air jet generator 100 according to the present embodiment is fixed to the tub 24 at a portion adjacent to the air tap 180 and the pressing portion 130 in which a vibration occurs, a vibration generated the air jet generator 110 may be reduced.

The bottom surface 25 of the tub 24 is disposed between the lower fixing plate 138 of the air crushing pipe 110 and the fixing ring 190. A sealer 196 for preventing washing water flowing the bottom surface 25 of the tub 24 from leaking to the lower side of the bottom surface 25 of the tub 24 is disposed between the fixing ring 190 and the bottom fixing plate 138 of the air crushing pipe 110. The sealer 196 may be disposed under and/or over the bottom surface 25 of the tub 24.

The air crushing pipe 110 has a reinforcing protruding portion 112 for reinforcing rigidity of the air crushing pipe 110 at an outer circumference in which the decompression portion 120 and the pressing portion 130 are formed. The reinforcing protruding portion 112 may reinforce rigidity of the pressing portion 130 and the decompression portion 120 formed long with a relatively small radius.

The reinforcing protruding portion 112 is protruded at an outer circumference of the air crushing pipe 110 in a longitudinal direction in which the decompression portion 120 and the pressing portion 130 form a flow path. Four reinforcing protruding portions 112 according to the present embodiment may be formed at 90° intervals at the outer circumferential surface of the air crushing pipe 110.

The air tap 180 has a disc shape, and in the air tap 180, a plurality of holes 182 penetrating the inside are formed. The washing water that has passed through the pressing portion 130 passes through the air tap. The air in the washing water is crushed thirdly while passing through a plurality of holes 182 formed in the air tap 180.

The holes 182 formed in the air tap 180 are densely disposed at regular intervals in the disk-shaped air tap 180. The air tap 180 may be an air-tap having a through-hole or a long hole formed long left and right. Further, a cross long hole in which an oval formed long upward and downward and an oval formed long left and right are coupled is also possible.

Because the hole 182 formed in the air tap 180 increases an amount of air bubble generated by increasing a shear force acting on the air bubble as a contact area with the air bubble increases, a long hole type is preferred over the through hole type. However, if the size of the hole is too large, as in a cross long hole type, it may be a problem in reliability of the air tap, and thus it is preferable to form a long hole. When the size of the hole formed in the air tap increases, the size of the crushed air increases. Therefore, in order to generate microbubbles, it is preferable that holes formed in the air tap are formed to a predetermined size or less.

The air jet generator 100 according to the present embodiment further includes an air tap fixing member 184 in which the air tap 180 is mounted and disposed detachably at the air crushing pipe 110. The air tap 180 is disposed over the air tap fixing member 184. The air tap 180 and the air tap fixing member 184 according to the present embodiment may be formed in one configuration. However, this is according to an embodiment, and the air tap 180 and the air tap fixing member 184 are formed in separate configurations, and thus it is also possible to be formed in a structure in which the air tap 180 is mounted in the air tap fixing member 184. According to the present embodiment, the air tap fixing member 184 has a hollow inside, and has a cylindrical shape having an open upper side and lower side, and an air tap may be mounted in the opened upper side of the air tap fixing member 184. The air crushing pipe 110 is mounted in the inner circumferential surface 185 of the air tap fixing member 184 and thus the inner circumferential surface 185 forms a flow path in which washing water inside the air crushing pipe 110 flows. The inner circumferential surface 185 of the air tap fixing member 184 may be formed in the same diameter as that of the expansion pipe portion 136 of the air crushing pipe 110.

The air tap fixing member 184 has a fastening protrusion 186 for coupling to the air crushing pipe 110 at the outer circumference. The fastening protrusion 186 of the air tap fixing member 184 is engaged with and fastened to the fastening groove 117 of the air tap mounting portion 116 to fix the air tap fixing member 184 inside the air crushing pipe 110.

The air tap fixing member 184 may be integrally formed with the air tap 180. The air tap fixing member 184 may be formed separately from the air tap and be coupled to the air tap. In this case, coupling by a fusion method is also possible. The air tap fixing member 184 according to the present embodiment may be detached from the upper side of the air crushing pipe 110. Accordingly, when the air tap is blocked due to accumulation of dirt on the air tap, the air tap fixing member 184 in which the air tap 180 is mounted may be detached from the air crushing pipe 110 to remove the dirt.

The air tap fixing member 184 is coupled to the nozzle 200 at the upper side. The air tap fixing member 184 and the nozzle 200 may be coupled by a fusion method.

The air tap fixing member 184 may include a fastening member 188 for fastening to the nozzle 200 disposed at the upper side. The fastening member 188 of the air tap fixing member 184 may be protruded upward from an upper portion of the air tap fixing member 184, and have a groove for inserting a fastening hook 202 formed in the nozzle 200. The fastening member 188 of the air tap fixing member 184 may be fastened to the fastening hook 202 of the nozzle 200 to fix the nozzle 200 and the air tap fixing member 184.

The nozzle 200 is disposed over the air crushing pipe 110. The nozzle 200 is disposed over the air jet generator 100 to discharge the washing water that has passed through the air jet generator 100 into the tub 24. The nozzle 200 is disposed over the air tap fixing member 184. The nozzle 200 according to the present embodiment may be coupled to the air tap fixing member 184 by a fusion method.

The nozzle 200 is formed to come into contact with the upper side of the air tap fixing member 184 at the lower side. The nozzle 200 may include a fastening hook 202 coupled to the fastening member 188 of the air tap fixing member 184. The nozzle 200 is coupled to the air tap fixing member 184 in which the air tap 180 is mounted. Accordingly, the user may rotate the nozzle protruded upward from the bottom surface 25 of the tub 24 to separate the air tap from the air crushing pipe 110.

The nozzle 200 according to the present embodiment is hollow inside and has a cylindrical shape opened downward. In the nozzle 200 according to the present embodiment, an inflow hole 206 for introducing washing water that passes through the air tap downward is formed, and a plurality of discharge holes 204a, 204b, and 204c in which the washing water is discharged to the tub 24 are formed at the upper circumferential surface. The plurality of discharge holes 204a, 204b, and 204c according to the present embodiment are spaced at regular intervals along the circumferential surface of the nozzle 200. The nozzle 200 according to the present embodiment has a plurality of discharge holes 204a, 204b, and 204c along the circumferential surface and thus washing water including air bubbles may be discharged to the bottom surface 25 of the tub 24 in various directions.

Referring to FIGS. 5A and 9 to 14, three discharge holes 204a, 204b, and 204c may be formed in the nozzle 200 according to the present embodiment. The three discharge holes 204a, 204b, and 204c may be spaced apart at a predetermined angle along a circumferential surface of the nozzle 200. The discharge holes 204a, 204b, and 204c according to the present embodiment may be formed at an angle θ of 70° to 90° to increase an injecting range of washing water injected to the bottom surface 25 of the tub 24. The three discharge holes 204a, 204b, and 204c according to the present embodiment may be opened at different angles.

The nozzle 200 according to the present embodiment includes a nozzle upper portion 200a forming an upper surface, and a nozzle lower portion 200b coupled to the nozzle upper portion 200a at the lower side of the nozzle upper portion 200a and mounted in the upper side of the air tap fixing member 184.

By coupling the nozzle upper portion 200a and the lower nozzle portion 200b, a plurality of discharge holes 204a, 204b, and 204c are formed at the circumferential surface.

The nozzle upper portion 200a and the nozzle lower portion 200b may be coupled by a fusion method. In the nozzle according to another embodiment, the nozzle upper portion and the nozzle lower portion may be formed in an integral configuration rather than separate configurations. A fastening hook 202 coupled to the fastening member 188 of the air tap fixing member 184 is formed in the nozzle lower portion 200b. A plurality of fastening hooks 202 are formed along the lower circumferential surface of the nozzle lower portion 200b. The plurality of fastening hooks 202 may be spaced at regular intervals along the lower circumferential surface of the nozzle lower portion 200b.

Figure 5A:
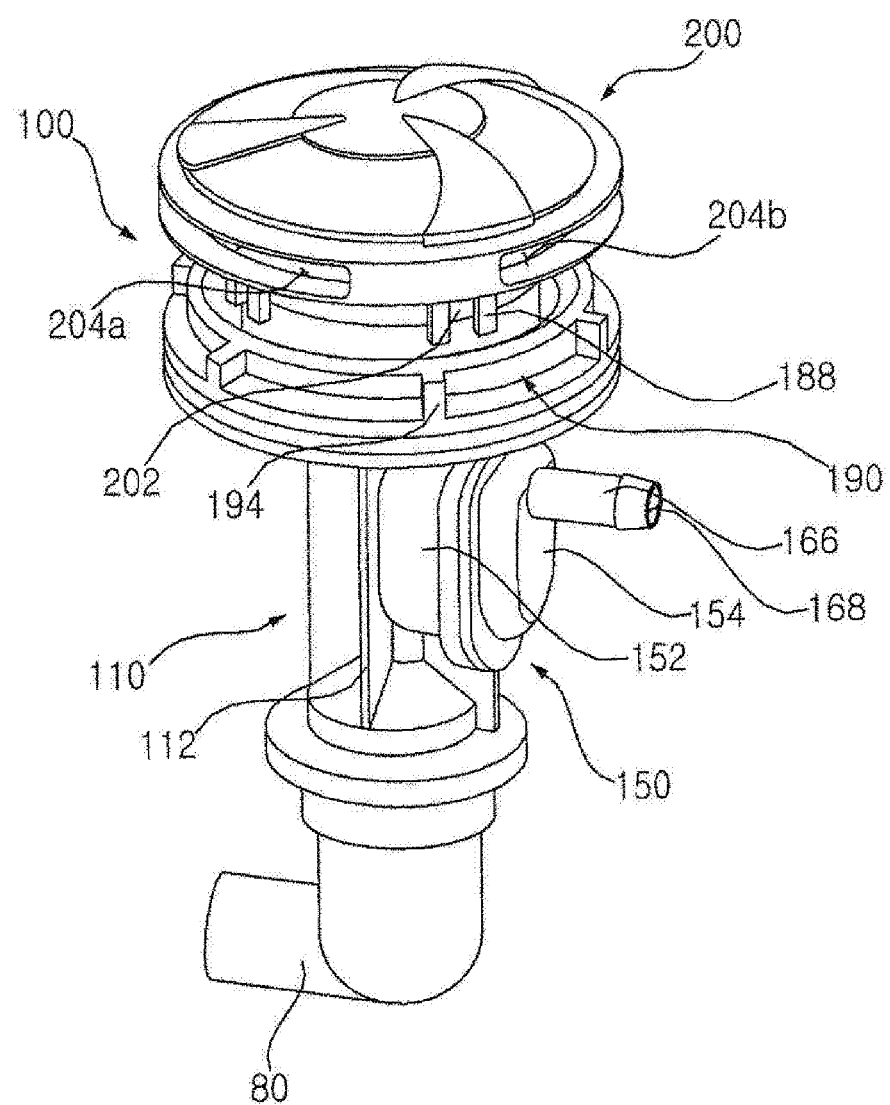
FIG. 5A is a perspective view of an air jet generator according to an embodiment of the present invention.
Figure 5B:
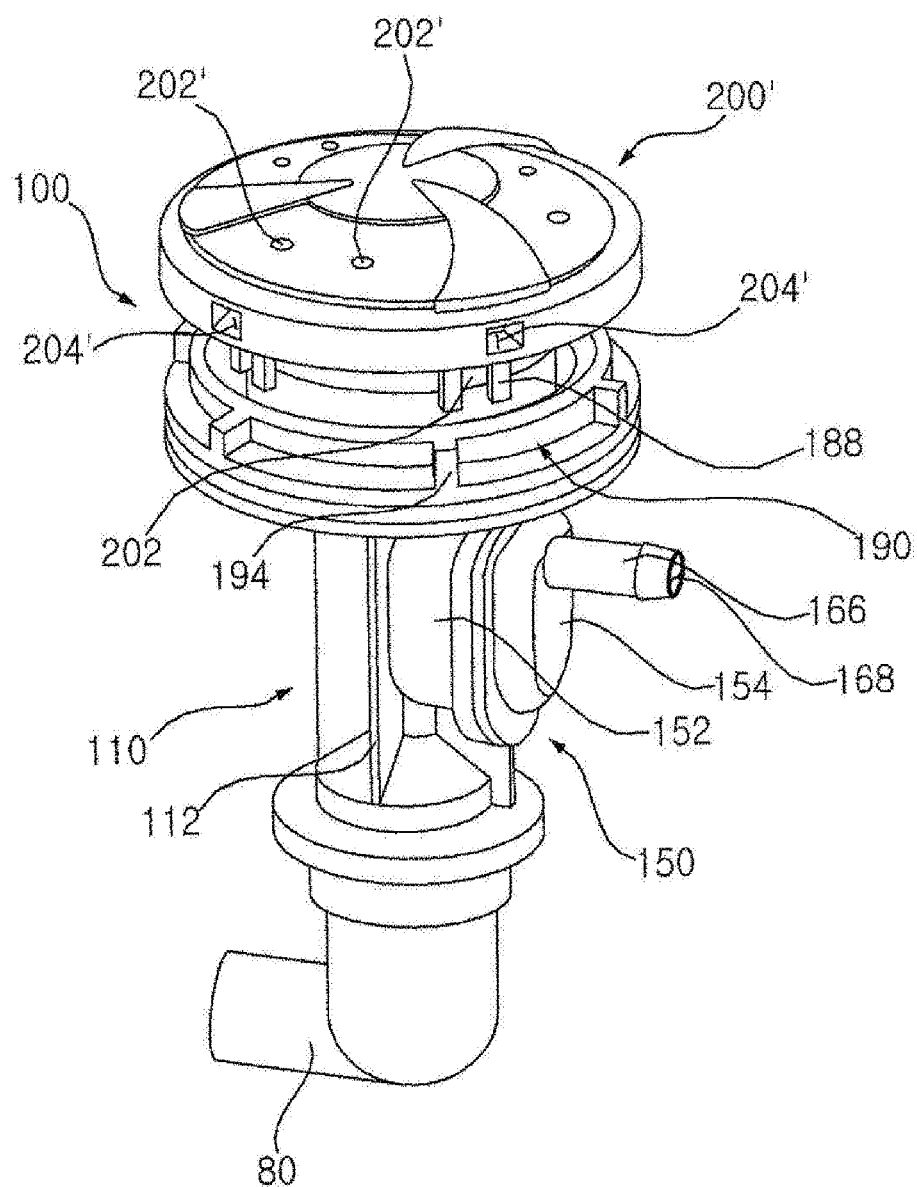
FIG. 5B is a perspective view of an air jet generator according to an embodiment of the present invention.
Figure 6:
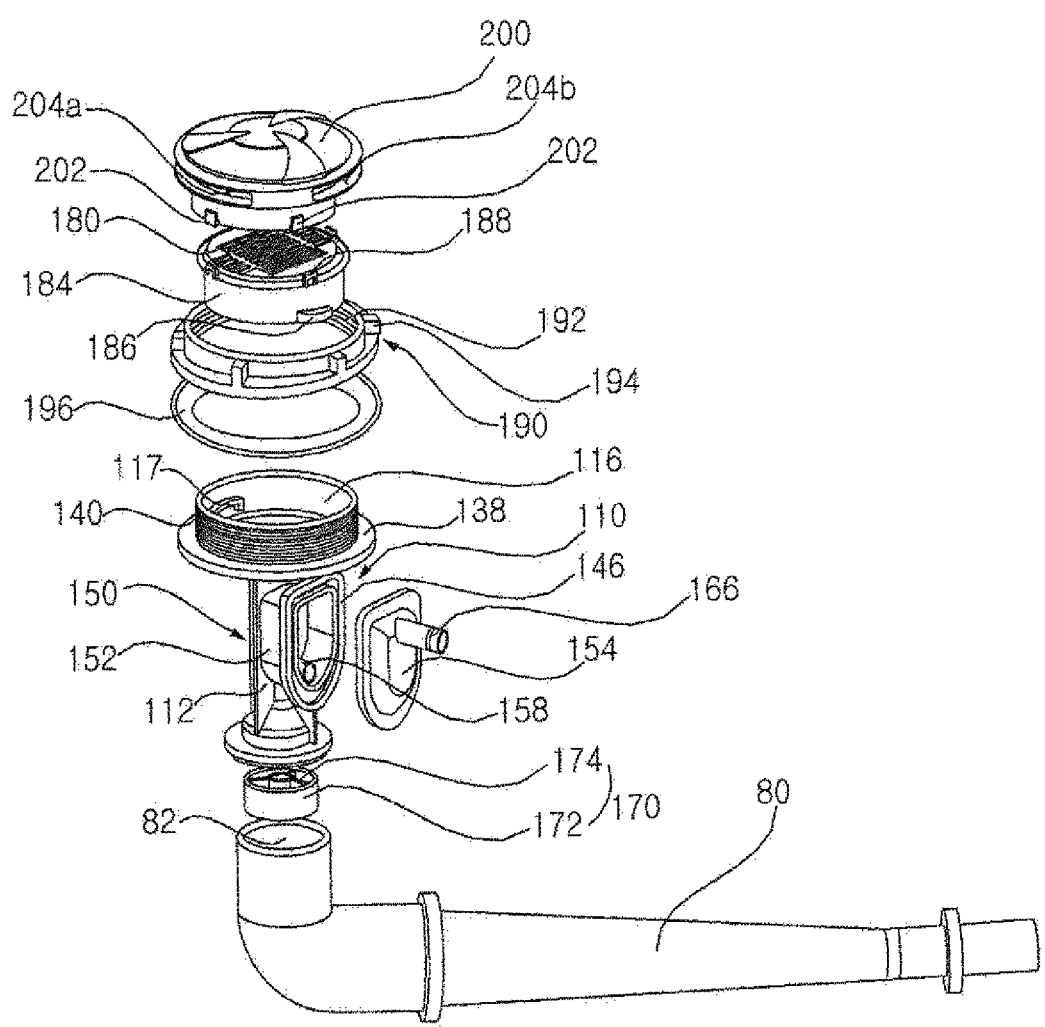
FIG. 6 is an exploded perspective view of an air jet generator according to an embodiment of the present invention.
Figure 7:
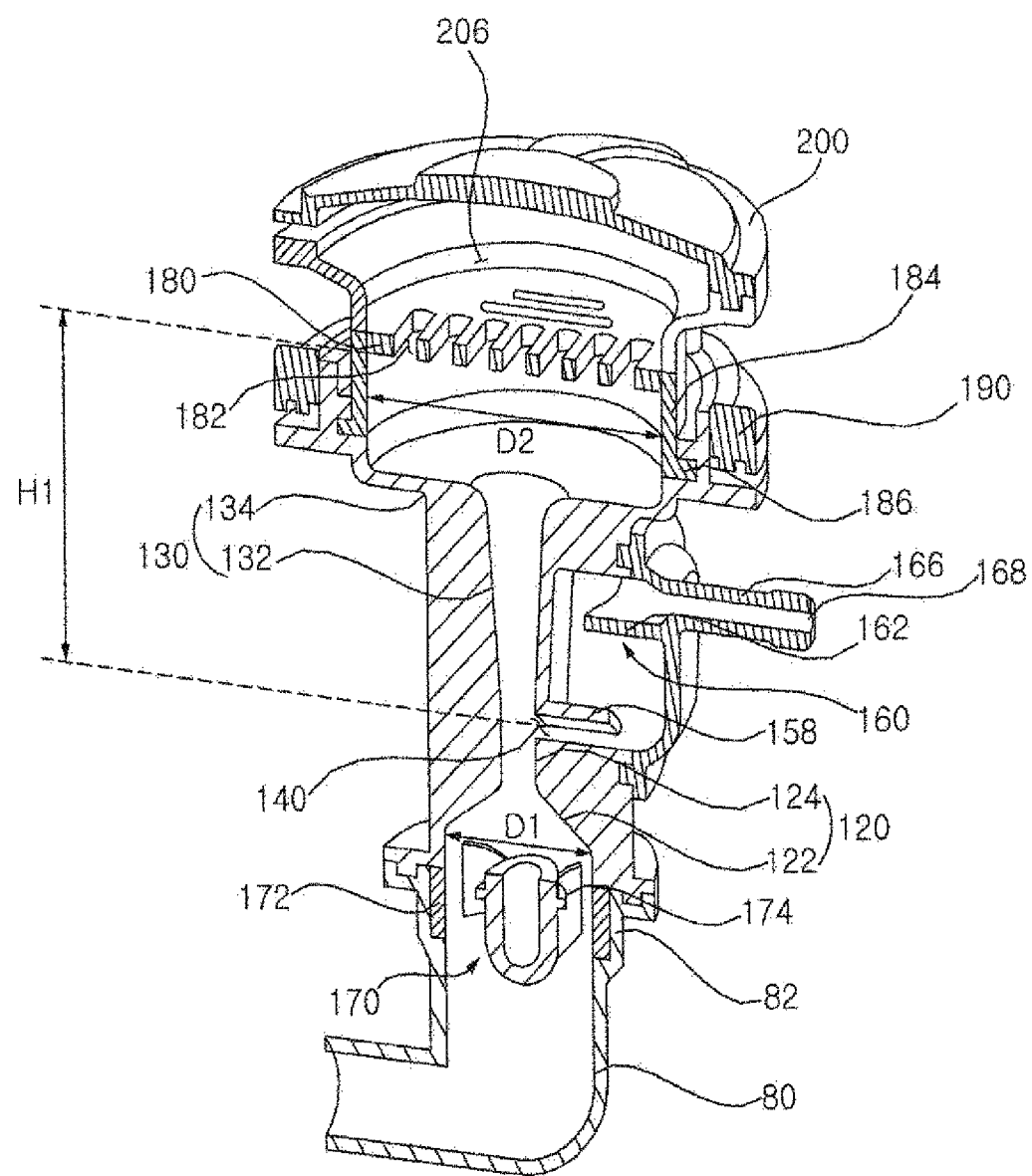
FIG. 7 is a cross-sectional view of an air jet generator according to an embodiment of the present invention.
Figure 8A:
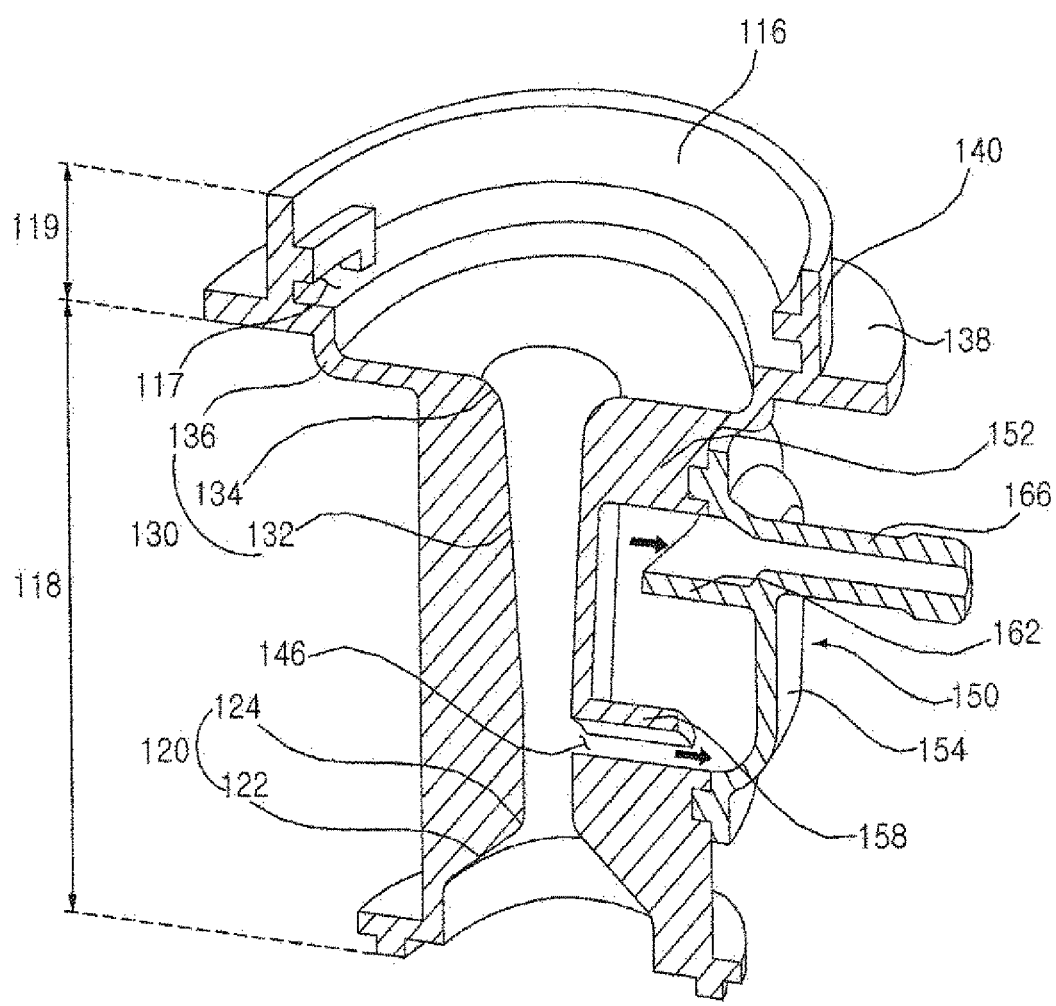
FIG. 8A is a cross-sectional view of an air crushing pipe according to an embodiment of the present invention.
Figure 8B:
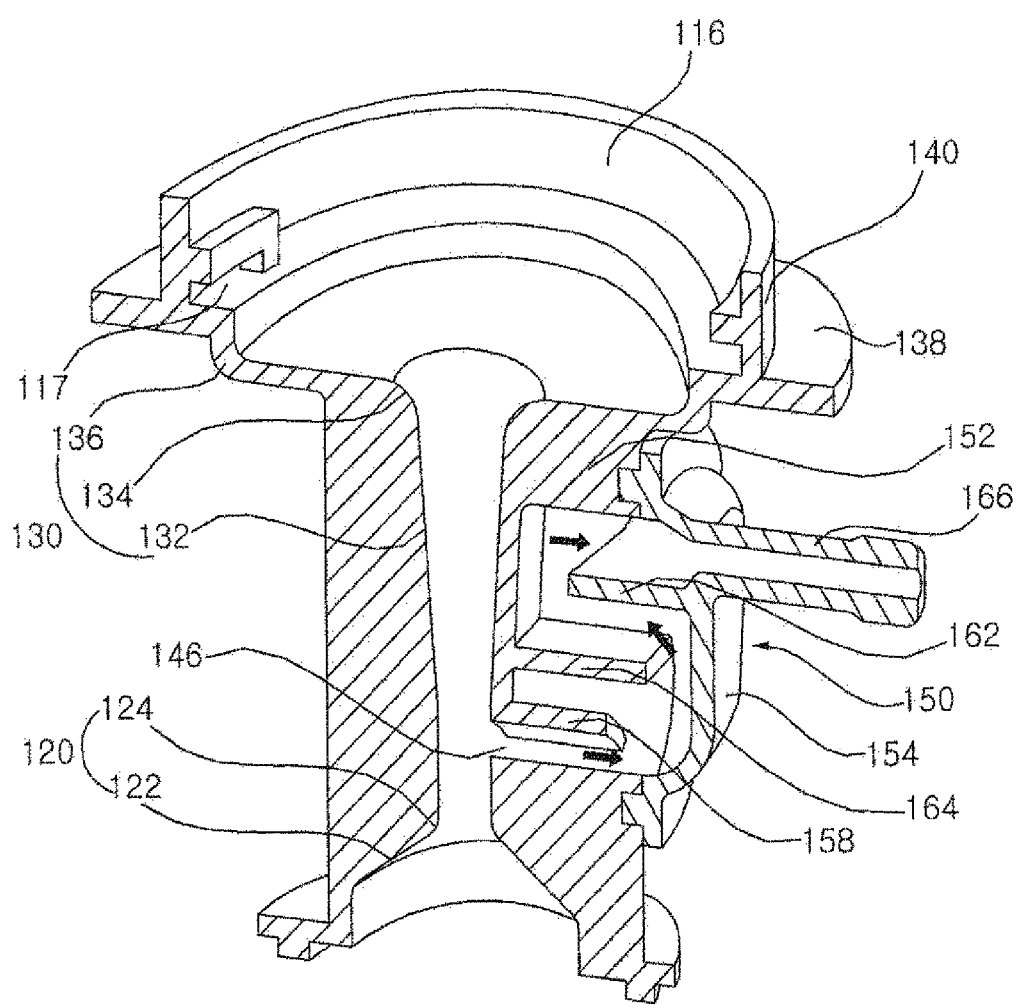
FIG. 8B is a cross-sectional view of an air crushing pipe according to another embodiment of the present invention.

Referring to FIGS. 5B and 15, a nozzle 200' according to another embodiment of the present invention may include a plurality of side discharge holes 204' formed along a circumferential surface thereof and a plurality of upper discharge holes 202' formed at an upper surface thereof.

The side discharge hole 204' according to the present embodiment may be formed in a size of 5 to 10. The plurality of side discharge holes 204' according to the present embodiment may be spaced at regular intervals along the circumferential surface of the nozzle 200'.

A plurality of upper discharge holes 202' according to the present embodiment may be formed at the upper surface of the nozzle 200'. In an air jet generator according to the present embodiment, washing water including air bubbles may be ejected in an upward direction of the tub 22. In this case, by adjusting a rotational speed of the washing motor 52, an ejection range of washing water ejected through the air jet generator may be adjusted. That is, by adjusting a rotational speed of the washing motor 52, it is possible to intensively wash dishes disposed at the upper side of the air jet generator.

The washing water including air bubbles is discharged to the bottom surface of the tub 24 to be introduced to the sump through the air jet generator 100. As the washing water flows through the bottom surface of the tub 24, the bottom surface of the tub 24 may be washed.

In the air jet generator 100 according to the present embodiment, a flow path in which washing water flows is disposed perpendicular to the ground or the bottom surface of the tub 24. Therefore, it is possible to minimize an area in which washing water flowing the pressing portion 130 does not flow due to rapid expansion of the flow path in the second pressing portion 134.

Although the preferred embodiments of the present invention have been illustrated and described above, the present invention is not limited to the specific embodiments described above, and various modifications can be made by those skilled in the art to which the present invention pertains without departing from the gist of the present invention claimed in the claims and, and these modifications should not be individually understood from the technical idea or prospect of the present invention.

DESCRIPTION OF SYMBOLS

| | |
|---|---|
| 10: dishwasher | 20: cabinet |
| 22: door | 24: tub |
| 26: sump | 50: washing pump |
| 80: branch pipe | 100: air jet generator |
| 110: air crushing pipe | 120: decompression portion |
| 130: pressing portion | 138: lower fixing plate |
| 140: upper fixing portion | 146: air inlet hole |
| 150: air chamber | 152: chamber body |
| 154: chamber cover | 158: first pipe |
| 160: second pipe | 170: impeller |
| 180: air tap | 190: fixing ring |
| 196: sealer | 200: nozzle |

What is claimed is:

1. A dishwasher, comprising:
   a tub that defines a space configured to receive dishes;
   an injection nozzle configured to inject washing water toward the dishes;
   a sump configured to store washing water;
   a washing pump configured to supply the washing water stored in the sump to the injection nozzle; and
   an air jet generator configured to receive at least some of the washing water from the washing pump, the air jet generator being configured to generate air bubbles in the washing water and to discharge the washing water to the sump,
   wherein the air jet generator comprises:
      an air crushing pipe comprising (i) a decompression portion configured to depressurize the washing water, (ii) a pressing portion configured to pressurize the washing water flowing downstream of the decompression portion, and (iii) an air inlet hole configured to introduce external air to a position downstream of the decompression portion,
      an air tap configured to crush air existing in the washing water discharged from the air crushing pipe, and
      an air tap coupler coupled to the air tap and detachably mounted in the air crushing pipe,
   wherein the dishwasher further comprises a connection nozzle connected to the air tap and configured to discharge the washing water that has passed through the air tap to the tub, and
   wherein the air tap coupler is coupled to the connection nozzle, and
   wherein the air crushing pipe is disposed below a bottom surface of the tub.

2. The dishwasher of claim 1, wherein the air jet generator further comprises an impeller for applying a centrifugal force to the washing water flowing to the decompression portion.

3. The dishwasher of claim 1, wherein the connection nozzle is mounted in the air crushing pipe at an upper side of the tub.

4. The dishwasher of claim 1, wherein the connection nozzle defines:
   an inflow hole configured to introduce the washing water that has passed through the air tap downward; and
   a plurality of discharge holes configured to discharge the washing water introduced into the inflow hole to the tub at an upper circumferential surface thereof.

5. The dishwasher of claim 1, wherein a portion of the air crushing pipe is coupled to the bottom surface of the tub and a lower portion of the bottom surface of the tub.

6. The dishwasher of claim 1, wherein the air crushing pipe comprises:
   a lower fixing plate disposed under the bottom surface of the tub and configured to limit an upward movement of the air crushing pipe; and
   an upper fixture disposed over the bottom surface of the tub and fastened to an air crushing pipe fixing ring that limits a downward movement of the air crushing pipe.

7. The dishwasher of claim 1, further comprising an air chamber that is disposed outside of the air crushing pipe and that defines a space in which air flows therein, the air chamber having an air passage communicating with the air crushing pipe at one side of a lower portion of the air chamber.

8. The dishwasher of claim 7, wherein the air chamber comprises a first pipe that extends inward from the air inlet hole along a lower surface inside of the air chamber.

9. The dishwasher of claim 7, wherein the air chamber has an external air inlet configured to introduce external air into an inner space of the air chamber.

10. The dishwasher of claim 9, wherein the external air inlet is defined at an upper surface of a surface opposite to a surface in which the air inlet hole is defined.

11. The dishwasher of claim 9, wherein the air chamber comprises a second pipe that extends from the external air inlet.

12. The dishwasher of claim 7, wherein the air chamber comprises:

a chamber body that protrudes outward from a circumferential surface of the air crushing pipe in which the air inlet hole is defined, the chamber body defining an inner space of the air chamber and having an opened one side; and a chamber cover that covers the opened one side of the chamber body and that defines an external air inlet configured to introduce external air into the inner space of the air chamber.

13. The dishwasher of claim 12, wherein the chamber body and the chamber cover are formed with separate configurations and are coupled by a fusion method.

14. The dishwasher of claim 7, further comprising an inner rib protruded to extend a flow path of the air inside the air chamber.

15. The dishwasher of claim 1, wherein the air tap is disposed detachably from the air crushing pipe.

* * * * *